United States Patent [19]

Notten

[11] Patent Number: 5,071,720
[45] Date of Patent: Dec. 10, 1991

[54] ELECTROCHEMICAL CELL
[75] Inventor: Petrus H. L. Notten, Eindhoven, Netherlands
[73] Assignee: U.S. Philips Corporation, New York, N.Y.
[21] Appl. No.: 459,903
[22] Filed: Jan. 2, 1990
[30] Foreign Application Priority Data
  Jul. 11, 1989 [NL] Netherlands ............ 8901776
[51] Int. Cl.$^5$ .................. H01M 4/38; H01M 10/36
[52] U.S. Cl. ................... 429/101; 429/218; 252/182.1; 420/900
[58] Field of Search .......... 429/27, 101, 218, 209; 420/900; 252/182.1

[56]       References Cited
       U.S. PATENT DOCUMENTS
  4,487,817 12/1984 Willems .............. 429/72
  4,814,002  3/1989 Grasselli et al. ........ 420/900
  4,849,205  7/1989 Hong ................... 420/900
  4,923,770  5/1990 Grasselli et al. ........ 429/101
  4,925,748  5/1990 Ikoma et al. ........... 429/101

Primary Examiner—Donald L. Walton
Attorney, Agent, or Firm—Norman N. Spain

[57] ABSTRACT

The invention relates to an electrochemical cell comprising a negative electrode of a stable hydride-forming material, in which a large loading capacity at low temperature is obtained by the addition of a catalytic material of the type $DE_3$, wherein D is one or more of the elements selected from Cr, Mo and W, and wherein E represents Ni and/or Co.

The catalytic material can be provided in the form of a eutectic segregation or it can be provided at the surface of powdered hydride-forming material by means of an electrochemical reaction.

16 Claims, 1 Drawing Sheet

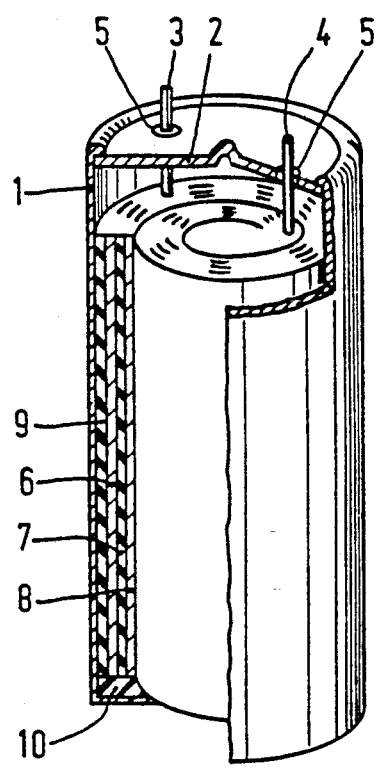

ELECTROCHEMICAL CELL

BACKGROUND OF THE INVENTION

The invention relates to an electrochemical cell comprising a negative electrode whose electrochemically active material consists of an intermetallic compound which forms a hydride with hydrogen and which has the $CaCu_5$-structure and a catalytic material at the surface of which hydrogen exhibits a large electrochemical activity.

The invention also relates to an electrochemically active material for use in such a cell and to a method of manufacturing such a material.

The electrochemical cell may be in open communication with the atmosphere or may be sealed from the atmosphere. A cell which is sealed from the atmosphere may comprise a valve which is dimensioned such that it becomes operative at a predetermined pressure.

In a rechargeable cell of the sealed type, the electrochemically active part of the positive electrode consists of, for example, nickel hydroxide, silver oxide or manganese oxide, nickel hydroxide being generally preferred for practical reasons.

An electrolyte is used in the cell, which generally consists of an aqueous solution of one or more alkali hydroxides such as lithium hydroxide, sodium hydroxide and potassium hydroxide, having a pH in excess of 7.

The cell may further comprise a separator which separates the electrodes electrically, but permits transport of ions and gas. The separator may consist of synthetic resin fibres (woven or non woven), for example, of polyamide fibres or polypropylene fibres.

Such an electrochemical cell is described in European Patent Application EP-A1-0251384 (U.S. Pat. No. 4,699,856). In this application, one or more of the metals Pd, Pt, Ir and Rh are added to the electrochemically active material to improve the loadability at low temperature and the activation speed of the cell.

A disadvantage of the known cell is that it requires the use of a relatively large quantity of a noble metal. When the noble metal is used in the form of a monolayer on the grains of the hydride-forming material, as is also described in EP-A1-0251384, a smaller quantity of the noble metal is required, but in this case, however, a labor-intensive electrochemical treatment is necessary to apply the monolayer. Moreover, for some applications it is desirable to further increase the loadability of the cell, in particular at low temperatures.

SUMMARY OF THE INVENTION

One of the objects of the invention is to provide an electrochemical cell and an electrochemically active material having a large loadability even at a low temperature, for use in such a cell. The aim of the invention is to achieve this by adding a material which has a catalytic effect on the formation and conversion of atomic hydrogen. The capacity of the cell to be manufactured should be as large as possible while preserving the other favourable properties of the cell. For this reason, it is desirable to achieve this purpose with the smallest possible quantity of the additive if the catalytic material is of a type in which no hydrogen is stored. A further object of the invention is to provide an electrochemical cell and an electrochemically active material which can meet these requirements without using noble metals.

An additional object of the invention is to provide a method of manufacturing the electrochemically active material in which the catalytic material is optimally distributed.

These objects are achieved according to the invention by an electrochemical cell and an electrochemically active material as described in the opening paragraph, which are characterized in that the catalytic material is of the type $DE_3$, wherein D is one or more of the elements selected from Cr, Mo and W, and wherein E is one or more of the elements selected from Ni and Co.

BRIEF DESCRIPTION OF THE DRAWING

The sole FIGURE in the drawing is a partly sectional and partly elevational view of a sealed rechargeable electrochemical cell of the invention.

DETAILED DESCRIPTION OF THE INVENTION

In a preferred embodiment of the electrochemical cell according to the invention, the catalytic material comprises the compound $Mo(Co, Ni)_3$, wherein Co and Ni may be present separately or together in any ratio.

The catalytic material is very effective, both in the electrochemical cell and in the electrochemically active material, if it is located on the grain boundaries of the intermetallic compound having the $CaCu_5$-structure. This is the case, in particular, when the average crystallite size of the intermetallic compound is less than 30 μm.

The use of the catalytic material is very advantageous with stable hydride-forming materials as described in, for example, U.S. Pat. No. 4,487,817. In said patent, the intermetallic compound having the $CaCu_5$-structure is of the type having the compositional formula: $AB_mC_n$, wherein m+n ranges between 4.8 and 5.4, wherein n has a value greater than 0 and up to 0.6, wherein A consists of Mischmetall or of one or more elements selected from the group consisting of Y, Ti, Hf, Zr, Ca, Th, La and the remaining rare earth metals, wherein B consists of two or more elements selected from the group consisting of Ni, Co, Cu, Fe and Mn, and wherein C consists of one or more elements selected from the group consisting of Al, Cr and Si.

To obtain a compound within the existence range of the intermetallic compound having the $CaCu_5$-structure, the overall atomic quantity of the elements Y, Ti, Hf and Zr preferably amounts to less than 40% of A.

In order to obtain an electrochemically stable material, the maximum atomic quantity per gram atom of A is for Ni: 3.5, for Co: 3.5, for Cu: 3.5, for Fe: 2.0 and for Mn: 1.0.

In order to obtain a corrosion-resistant material, n preferably has a value of at least 0.05. In this case, C consists of one or more of the elements selected from the group consisting of Al, Cr and Si in the atomic quantities indicated, Al: 0.05–0.6, Cr: 0.05–0.5 and Si: 0.05–0.5.

Further according to the invention, an electrochemical material of the invention is achieved by a method in which the intermetallic compound having the $CaCu_5$-structure is ground to obtain a powder, after which the grains thus formed are provided electrochemically with a layer of the catalytic material. Electrochemical methods are to be understood to include a galvanic method, a currentless deposition method and an exchange method. A particular advantage of this method is that it permits a maximum quantity of catalytic material to be applied to the powder surface. In an optimum situation, the layer of the catalytic material is not thicker than a monolayer, so that the overall quantity of the hydride-forming intermetallic compound is as large as possible and the hydrogen can diffuse to the intermetallic compound via a short path.

A simple and little labor efficient alternative method of manufacturing an electrochemical material, in which the catalytic material is located on the grain boundaries of the intermetallic compound having the $CaCu_5$-structure is characterized according to the invention in that a non-stoichiometric melt is made of the elements A, B and C, the composition being selected such that it is outside the existence range of the compound $AB_mC_n$, and a part of the elements B being replaced by one or more elements D, the melt being cooled while forming a two-phase material consisting of the compound having the $CaCu_5$-structure and of the catalytic material. In this case, an excess of the elements B is used for the quantity of element E which is necessary for the catalytic material $DE_3$. This means that in the preferred compositions indicated the composition of the melt corresponds to the compositional formula $AB_pC_n$, wherein $p+n$ is larger than 5.4.

In the above-described stable hydride-forming materials which are known per se, an increased corrosion resistance and electrochemical stability is attained (during a large number of charging and discharging cycles) by means of substitutions and additions to the generic $LaNi_5$-compound, which is to be manufactured partly at the expense of the capacity of the cell. The sometimes adverse consequences can be overcome partly by the larger loadability attained according to the invention.

The catalytic activity for the formation of hydrogen can be measured by means of the exchange current density $J_o$ which is higher for the noble metals Pt, Pd, Rh and Ir than for Co, Ni, W and Mo, see an article by S. Trasatti in J. Electroanal. Chem. 39, pages 163 to 184 (1972), in particular FIGS. 3 and 4 on pages 173 and 175. Consequently, it is surprising that compounds of Co and/or Ni with W and/or Mo render an at least equally good result, all the more because these compounds, unlike Pt and Pd, do not form hydrides with hydrogen themselves. In an article by M. M. Jaksic in Electrochimica Acta, 29 (11), pages 1539 to 1550 (1984) the catalytic activity of compounds such as $MoCo_3$, $WNi_3$ and $MoNi_3$ is attributed to a synergetic effect. From this article it can be derived that besides W and Mo also Hf and Zr, and besides Ni and Co also Fe may be candidates for the formation of compounds which are catalytically active for the formation of hydrogen. With respect to $LaNi_5$, it has been established in experiments leading to the invention that the life of the electrochemical cell and the corrosion resistance of the electrochemically active material are insufficient for practical use.

The use of the catalytic materials of the invention in an electrochemical cell and an electrochemically active material according to the invention has the additional advantage that few new elements are introduced into the overall composition. According to the invention, a small addition of Mo and/or W and an increase of the quantity of Ni and/or Co relative to La and the other rare earth metals is sufficient.

The invention will be explained in greater detail by means of exemplary embodiments and with reference to the drawing.

EXAMPLE OF A RECHARGEABLE CELL CONSTRUCTION

The cell (as shown in the Figure), is sealed from the air by means of a suitable housing 1 of metal, such as stainless steel, the a cover 2 in which apertures are formed for conductors 3 and 4. These conductors are insulated from the metal housing 1 and 2 by some means of synthetic resin rings 5. The outside diameter of the housing may be, for example, 22 mm and the height may be 41 mm. A roll of a negative electrode 6, a separator 7 and a positive electrode 8 are accommodated in the space inside the housing, the resultant assembly being surrounded by an electrically insulating synthetic resin foil 9 of, for example, polyvinyl chloride, and supported by a disc 10 of an electrically insulating material such as polyvinyl chloride.

The negative electrode 6 consists of a hydride-forming intermetallic compound as described hereinbefore and is connected to the conductor 3. The negative electrode 6 is manufactured by fusing suitable quantities of the relevant elements, pulverizing the intermetallic compound thus formed and applying it to a nickel carrier, for example, by means of a polymer binder material such as polyvinyl alcohol. The intermetallic compound can be pulverized, for example by grinding, to a grain size of approximately 40 $\mu$m. When the cell is activated by repeated hydrogen adsorption and desorption the grain growth is further reduced to the order of magnitude of 1 to 5 $\mu$m.

The positive electrode 8 is a nickel hydroxide electrode of the conventional sintered type which is connected to the conductor 4. A 6N potassium hydroxide solution in water is used as the electrolyte. The electrolyte is absorbed in the separator 7 and is in wetting contact with the electrochemically active material of the two electrodes. The separator 7 is in the form of a non-woven membrane of polyamide fibres.

The free gas space in the cell is approximately 5 cm$^3$. A sealed cell of this type has an EMF of between 1.2 and 1.4 V. The cells according to the invention can be assembled in a conventional manner to form batteries comprising, for example, several series-arranged cells.

COMPARATIVE EXAMPLE A, NOT ACCORDING TO THE INVENTION

An electrochemically active material for the negative electrode, having the composition $La_{0.8}Nd_{0.2}Ni_{2.5}Co_{2.4}Si_{0.1}$ is prepared by mixing the necessary quantities of the various components, after which they are fused, cooled, ground and pulverized by repeated hydrogen adsorption and desorption. The powder formed has a surface area of approximately 0.25 m$^2$/g. Subsequently, an electrode is formed and incorporated in a cell, for example, as described hereinabove.

The loadability of the negative electrode is determined at 25° C. by measuring the storage capacity of the cell in charging and discharging cycles at a rate of 2.0 C, i.e. at a rate of charging and discharging which would supply to or extract from the cell 2.0 times the nominal capacity of the cell in 1 hour. The nominal capacity of a cell is the capacity at a low charging and discharging rate.

The loadability after 10 charging and discharging cycles is 30% of the maximum value, after 20 cycles it is 90%, after 30 cycles it is 100% and after 300 cycles it is 95%.

At 0° C., the loadability after a great number of cycles is only 50% of the value at 25° C. If the discharging rate is increased to 3.0 C, the loadability at 0° C. is only 35% of the value at 25° C. The exchange current density $J_0$ is measured after more than 100 cycles and at a degree of loading of 15%, and is 190 mA/g.

COMPARATIVE EXAMPLE B, NOT ACCORDING TO THE INVENTION

An electrochemical cell is manufactured as described in comparative example A, using a composition of the melt according to the formula $La_{0.8}Nd_{0.2}Ni_{3.0}Co_{2.4}Si_{0.1}$. This composition is outside the existence range of the intermetallic compound having the $CaCu_5$-structure. For this reason, a second phase is formed, during cooling, on the grain boundaries in addition to the intermetallic compound. Said second phase consists of Ni and Co, having a composition near $NiCo_{2.8}$. This material, in which no hydrogen is stored, acts catalytically on the formation of hydrogen.

When the melt is cooled slowly, crystallites having dimensions of 60 to 100 μm are formed. In the electrode manufactured, the loadability at 3.0 C and 0° C. is 50% of the value at 25° C. The exchange current density is 287 mA/g.

When the melt is cooled rapidly, crystallites are formed having dimensions of 10 to 30 μm. In this case, the loadability at 3.0 C and 0° C. is 70% of the value at 25° C. The exchange current density is 338 mA/g.

COMPARATIVE EXAMPLE C, NOT ACCORDING TO THE INVENTION

An electrochemical cell is manufactured as described in example A, the composition of the electrochemically active material for the negative electrode being represented by the compositional formula $La_{0.8}Nd_{0.2}Ni_{2.5}Co_{2.0}Pd_{0.4}Si_{0.1}$. In the cell manufactured, the loadability at 3.0 C and 0° C. is more than 90% of the value at 25° C. The exchange current density is approximately 500 mA/g.

EXAMPLE 1

An electrochemical cell is manufactured as described in example A, the composition in the melt corresponding to the formula $La_{0.8}Nd_{0.2}Ni_{3.0-x}Mo_xCo_{2.4}Si_{0.1}$. An optimum composition is attained when x has a value of approximately 0.1. In conformity with example B, a second phase is formed during cooling. The dimensions of these eutectic segregations is in the order of magnitude of 1 to 2 μm, at an average crystallite size of the intermetallic compound having the $CaCu_5$-structure of 30 μm. The second phase consists of $MoCo_3$ with a small quantity of Ni. The composition can be represented by the formula $Mo(Co, Ni)_3$. $MoCo_3$ and $MoNi_3$ can be mixed in wide ratios and each form compounds having a small existence range, i.e., the ratio Mo to Co and/or Ni is always fairly accurately 1:3. In conformity with example B, the crystallite size can be influenced advantageously as well as the dimension of the eutectic segregations by the choice of the cooling rate.

When the material is pulverized by means of repeated hydrogen adsorption and desorption, particles having dimensions of approximately 1 μm are formed. To obtain a proper distribution of the catalytic material in the electrochemically active material it is useful to cool the melt rapidly so that a small average crystallite size is obtained, preferably smaller than 30 μm.

In the electrochemical cell manufactured, the loadability at 3.0 C and 0° C. is 90% of the value at 25° C. The exchange current density is 585 mA/g.

The electrochemically active material which is used according to the present example is sufficiently resistant to corrosion. After more than 100 charging and discharging cycles the capacity of the electrochemical cell was 91% of the maximum value.

EXAMPLE 2

An electrochemical cell is manufactured as described in example A, the composition of the electrochemically active material also being the same. After the melt has cooled, the material is ground to a grain size of approximately 40 μm. By means of electrodeposition a layer of $MoNi_3$ is formed at the surface. Instead of $MoNi_3$, $WNi_3$ can also suitably be used.

The results obtained are at least just as good as when Pd-containing materials are used having a Pd content of 0.4 in the compositional formula of the intermetallic compound having the $CaCu_5$-structure.

I claim:

1. An electrochemical cell comprising a negative electrode which electrode comprises an electrochemical active material consisting of an intermetallic compound of the formula $AB_mC_n$ wherein m plus n is between 4.8 and 5.4, n has a value of up to 0.6 and greater than 0, A is a Mischmetall or at least one element of the group consisting of Y, Ti, Hf, Zr, Ca, Th, La and the remaining rare earth metals, B is at least two elements selected from the group consisting of Ni, Co, Cu, Fe and Mn and C consists of at least one element selected from the group consisting of Al, Cr and Si, and has a $CaCu_5$ structure, and a catalytic material at the surface of which hydrogen exhibits a large electrochemical activity, said catalytic material having a composition of formula $DE_3$ wherein D is at least one element selected from the group consisting of Cr, Mo and W and E is at least one element selected from the group consisting of Ni and Co.

2. An electrochemical cell as claimed in claim 1, characterized in that the catalytic material comprises the compound $Mo(Co, Ni)_3$.

3. The electrochemical cell as claimed in claim 2, characterized in that the catalytic material is located at the grain boundaries of the intermetallic compound having the $CaCu_5$-structure.

4. An electrochemical cell as claimed in claim 1, characterized in that the catalytic material is located at the grain boundaries of the intermetallic compound having the $CaCu_5$-structure.

5. A negative electrode comprising an electrochemically active material consisting of an intermetallic compound of the formula $AB_mC_n$ wherein m plus n is between 4.8 and 5.4, n has a value of up to 0.6 and greater than 0, A is a Mischmetall or at least one element of the group consisting of Y, Ti, Hf, Zr, Ca, Th, La and the remaining rare earth metals, B is at least two elements selected from the group consisting of Ni, Co, Cu, Fe and Mn and C consists of at least one element selected from the group consisting of Al, Cr and Si, and has a $CaCu_5$ structure, and a catalytic material at the surface of which hydrogen exhibits a large electrochemical activity, said catalytic material having a composition of formula $DE_3$ wherein D is at least one element selected from the group consisting of Cr, Mo and W and E is at least one element selected from the group consisting of Ni and Co.

6. The negative electrode as claimed in claim 5, characterized in that the catalytic material is located on the grain boundaries of the intermetallic compound having the $CaCu_5$-structure.

7. The negative electrode as claimed in claim 6, characterized in that the average crystallite size of the intermetallic compound is less than 30 μm.

8. The negative electrode as claimed in claim 7, characterized in that the intermetallic compound having the $CaCu_5$-structure is of the type having the compositional formula $AB_mC_n$, wherein m+n ranges between 4.8 and 5., wherein $0<n\leq 0.6$, wherein A consists of Mischmetall or of one or more of the elements selected from the group consisting of Y, Ti, Hf, Zr, Ca, Th, La and the other rare earth metals, wherein B consists of two or more elements selected from the group consisting of Ni, Co, Cu, Fe and Mn, and wherein C consists of one or more of the elements selected from the group consisting of Al, Cr and Si.

9. The negative electrode as claimed in claim 5, characterized in that the intermetallic compound having the $CaCu_5$-structure is of the type having the compositional formula $AB_mC_n$, wherein m+n ranges between 4.8 and 5.4, wherein $0<n\leq 0.6$, wherein A consists of Mischmetall or of one or more of the elements selected from the group consisting of Y, Ti, Hf, Zr, Ca, Th, La and the other rare earth metals, wherein B consists of two or more elements selected from the group consisting of Ni, Co, Cu, Fe and Mn, and wherein C consists of one or more of the elements selected from the group consisting of Al, Cr, and Si.

10. The negative electrode as claimed in claim 9, characterized in that the overall atomic quantity of the elements Y, Ti, Hf, Zr is less than 40% of A.

11. The negative electrode as claimed in claim 9, characterized in that per gram atom of A the maximum atomic quantity is for Ni: 3.5, for Co: 3.5, for Cu: 3.5, for Fe: 2.0 and for Mn: 1.0.

12. The negative electrode as claimed in claim 11, characterized in that the value of n is at least 0.05.

13. A method of manufacturing the negative electrode as claimed in claim 5, characterized in that the intermetallic compound having the $CaCu_5$-structure is ground to form a powder, after which the grains thus formed are electrochemically provided with a layer of the catalytic material.

14. An electrochemically active material consisting of an intermetallic compound of the formula $AB_mC_n$ wherein m plus n is between 4.8 and 5.4, n has a value of up to 0.6 and greater than 0, A is a Mischmetall or at least one element of the group consisting of Y, Ti, Hf, Zr, Ca, Th, La and the remaining rare earth metals, B is at least two elements selected from the group consisting of Ni, Co, Cu, Fe and Mn and C consists of at least one element selected from the group consisting of Al, Cr and Si, and has a $CaCu_5$ structure, and a catalytic material at the surface of which hydrogen exhibits a large electrochemical activity, said catalytic material having a composition of formula $DE_3$ wherein D is at least one element selected from the group consisting of Cr, Mo and W and E is at least one element selected from the group consisting of Ni and Co.

15. The negative electrode as claimed in claim 14, characterized in that C consists of one or more of the elements selected from the group consisting of Al, Cr and Si in the indicated atomic quantities Al: 0.05–0.6, Cr: 0.05–0.5 and Si: 0.05–0.5.

16. A method of manufacturing an electrochemically active material consisting of an intermetallic compound of the formula $AB_mC_n$ wherein m plus n is between 4.8 and 5.4 and wherein $0<n\leq 0.6$, A is a Mischmetall or at least one element selected from the group consisting of Y, Ti, Hf, Zr, Ca, Th, La and the remaining rare earth metals, B is at least two elements selected from the group consisting of Ni, Co, Cu, Fe and Mn and C is at least one element selected from the group consisting of Al, Cr and Si, said intermetallic compound having a $CaCu_5$ structure and a catalytic material, at the surface of which hydrogen exhibits a large electrochemical activity, said catalytic material having a composition of the formula $DE_3$ wherein D is at least one element selected from the group consisting of Cr, Mo and W and E is at least one element selected from the group consisting of Ni and Co and said catalytic material is located on the grain boundaries of the intermetallic compound having the $CaCu_5$ structure, said method comprising forming a non-stoichiometric melt of the formula $AB_pC_n$ wherein A, B, C and n have their above-stated meanings, p+n is larger than 5.4 and a portion of the elements B is replaced by at least one of the elements D and cooling said melt to thereby form a two-phase material consisting of the compound having the $CaCu_5$-structure and the catalytic material.

* * * * *